Patented Nov. 22, 1932

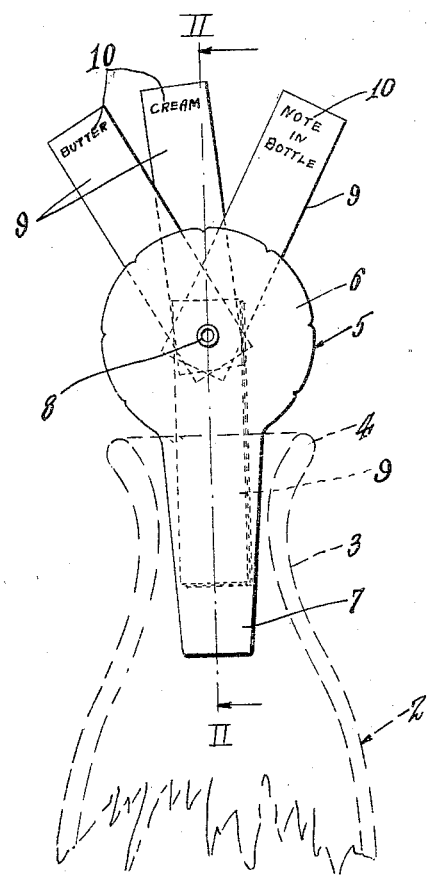
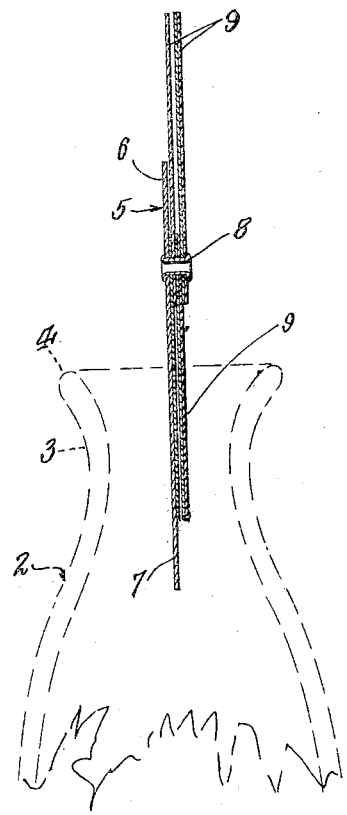

1,888,368

UNITED STATES PATENT OFFICE

MARTIN W. ALLEN, OF LOS ANGELES, CALIFORNIA

DAIRY FLAG

Application filed October 30, 1931. Serial No. 571,985.

This invention relates to what is known as a dairy flag, or device, intended to be inserted into an empty dairy bottle to indicate to the dairyman the products desired by a customer.

Heretofore, various forms of flags have been used for informing the dairyman of the products desired. These flags ordinarily have been inserted into the bottle and rested on the bottom inner wall of the bottle. When so disposed, the dairy flags are subject to contamination, or wetting, from any dirt or moisture which may be on the bottom of the empty dairy bottle.

It is the general object of the present invention to provide a simple and economical form of dairy flag which is so designed that it may be supported or suspended by the neck of the bottle in position to have part of its ordering markers extending down into the bottle but held above the bottom of the bottle, and have the further part of its ordering markers extending upwardly into view above the dairy bottle so as to indicate to the dairyman the products desired.

The present invention, together with various objects and advantages thereof, will best be understood from a description of the preferred form or example of dairy flag embodying the invention. For this purpose, there is hereafter described, with reference to the accompanying drawing, the preferred form or example of the invention.

In the drawing:

Figure 1 is an elevation of the dairy flag showing it in position in a dairy bottle; and Figure 2 is a section of the line 2—2 in Figure 1.

Referring to the drawing, 2 indicates a dairy bottle, such as the usual pint or quart size, having the usual slightly restricted neck 3 and rounded lip 4. The dairy flag comprises a body piece 5, which includes an enlarged head portion 6 and a depending leg portion 7. The head portion 6 may be round, square, or various other shapes, but sufficiently large so as to seat upon the lip 4 of the neck 3 of a dairy bottle, and the depending leg 7 is intended to extend loosely down into the bottle so as to hold loosely the dairy flag in position. The leg 7 is made of less length than the depth of the dairy bottle, so that all parts of the flag are suspended above the bottom of the bottle and hence are not subject to contamination, or wetting, from any contents that may remain in the bottle.

At approximately the center of the head portion 6 there is an eyelet 8, to which is pivoted a plurality of dairy markers or flags 9 which bear suitable indicia 10 for indicating the particular products desired by the customer. These flags are so pivoted at the eyelet 8 that they are capable of being swung into a position extending partially downwardly into the bottle but terminating above the bottom of the bottle, or into other positions where they are exposed to view above the headpiece of the body member 5 where they will indicate to the dairyman the particular products desired by the customer.

No particular materials of construction are required for the dairy flag, but satisfactory dairy flags have been made in which all of the markers or flags 9 and also the body member 5 are made of stiff paper or cardboard.

While the particular form of the invention herein described is well adapted to carry out the objects of my invention, it is understood that various modifications and changes may be made without departing from the spirit of the invention, and this invention includes all such modifications and changes which come within the scope of the appended claims.

I claim:

1. A dairy flag comprising a body member having an enlarged portion and a depending leg portion, the enlarged body portion being adapted to rest upon the lip of the dairy bottle when the leg portion extends partially into the dairy bottle, an eyelet attached to said body member, and a plurality of dairy markers pivoted at one end to said eyelet and adapted to move into depending suspended positions where they extend down into the dairy bottle and into display positions where they are pivoted upwardly and appear above the enlarged portion of the body member, the dairy markers being relatively shorter than the leg of said body member and of relatively less width.

2. A dairy flag comprising a body member having an enlarged portion and a depending leg portion, the enlarged body portion being adapted to rest upon the lip of the dairy bottle when the leg portion extends partially into the dairy bottle, an eyelet attached to said body member, and a plurality of dairy markers pivoted at one end to said eyelet and adapted to move into depending suspended positions where they extend down into the dairy bottle and into display positions where they are pivoted upwardly and appear above the enlarged portion of the body member, said markers being provided with suitable indicia for indicating different dairy products, the dairy markers being relatively shorter than the leg of said body member and of relatively less width.

Signed at Los Angeles, Calif., this 29th day of Sept. 1931.

MARTIN W. ALLEN.